United States Patent [19]
Kim

[11] Patent Number: 6,073,069
[45] Date of Patent: Jun. 6, 2000

[54] DEVICE FOR STABILIZING THE MAST TILTING ANGLE OF A CARGO EQUIPMENT AND CONTROL METHOD FOR THE SAME

[75] Inventor: Chang Soo Kim, Changwon, Rep. of Korea

[73] Assignee: Clark Material Handling Asia, Inc., Rep. of Korea

[21] Appl. No.: 08/889,215

[22] Filed: Jul. 8, 1997

[30]    Foreign Application Priority Data

Oct. 23, 1996 [KR]   Rep. of Korea ..................... P96-47838

[51] Int. Cl.[7] .................................. E02F 3/76; G06F 7/70
[52] U.S. Cl. ............................. 701/50; 172/4.5; 172/826; 172/2
[58] Field of Search ................................ 701/50; 172/4.5, 172/2, 7, 9, 826; 414/477, 478, 480, 273, 636, 635, 674; 91/394, 445, 189 R

[56]    References Cited

U.S. PATENT DOCUMENTS

| | | | |
|---|---|---|---|
| 3,831,492 | 8/1974 | Young | 91/394 |
| 3,960,286 | 6/1976 | Spooner et al. | 414/635 |
| 4,221,530 | 9/1980 | Williams, IV et al. | 414/673 |
| 4,491,918 | 1/1985 | Yuki et al. | 701/50 |
| 5,006,033 | 4/1991 | McConnell | 414/477 |
| 5,462,125 | 10/1995 | Stratton et al. | 172/826 |
| 5,467,829 | 11/1995 | Barton et al. | 172/4.5 |

*Primary Examiner*—Jacques H. Louis-Jacques
*Attorney, Agent, or Firm*—Harness, Dickey & Pierce, P.L.C.

[57]    ABSTRACT

A device for stabilizing mast tilting angle of a cargo equipment with a tilt-cylinder for controlling the angle of the mast; a main valve for driving said tilt-cylinder according to the operation of the driver as to the direction of the hydraulic fluid; and a plurality of solenoid valve, selectively opening fluid passages in response to electric signals, and deciding the supply direction of the hydraulic fluid to drive said tilt-cylinder. The tilt-cylinder controls the mast angle through the supply of the hydraulic fluid.

5 Claims, 7 Drawing Sheets

*Fig-1A*

*Fig-1B* a,b : ON / OFF SOLENOID VALVE

Fig-6
PRIOR ART t1 : SW1 - ON    t2 : SW2 - OFF

Fig-7 t1 : SW1-ON, t2 : SW1-OFF

DEVICE FOR STABILIZING THE MAST TILTING ANGLE OF A CARGO EQUIPMENT AND CONTROL METHOD FOR THE SAME

BACKGROUND OF THE INVENTION

1. Field of the Invention

The present invention relates to a safer device for stabilizing mast tilting angle and a method for controlling the same in a cargo equipment, especially during cargo-working or freight transporting.

2. Description of the Prior Art

Generally, a cargo equipment, such as a forklift, is used to load, unload, and transport freight a short distance. In order to work more safely, the freight must be kept horizontal to the surface so as to prevent the freight from dropping. This makes the balancing of the freight supporting means important. Therefore, the tilting angle of the freight supporting means, such as the mast of the forklift, must be maintained within a certain degree. Substantial tilt angle of the mast (absolute tilt angle) as well as the tilt angle of the cargo equipment were indicated in the conventional cargo equipment,. However, no device for stabilizing the indicated tilt is yet known, thereby rendering the work efficiency of the cargo equipment to depend solely on the recognition of the absolute tilt angle and a reaction thereto by the driver. That is, when transporting or unloading the freight by means of the cargo equipment, the driver must decide and control the speed of the cargo equipment to control the tilt of the mast. Therefore, an unexperienced driver may drop the freight during cargo work, if not skilled in sensing the indicated tilting angle.

The U.S. Pat. No. 5,374,155 tries to solve this problem through connection of separate equipment to the mast of the forklift. However, this conventional technology caused the driver to exit the seat to stabilize the freight by means of a strap and an arm, which is time-consuming.

SUMMARY OF THE INVENTION

Accordingly, it is an object of the present invention to provide a device for stabilizing tilting angle and a method for controlling the same that can maintain a mast tilting angle of a cargo equipment relative to the surface within a certain range, which takes into considerations the conditions of the surface or the driving speed of the equipment.

In order to attain such an object, the device for stabilizing a mast tilting angle and method for controlling the same according to the present invention characterizes in a device and a method sensing the mast tilting angle and carrying out a control to compensate for the mast tilting angle, and warning the driver when the stability reached by the application of the present invention is insufficient.

BRIEF DESCRIPTION OF THE DRAWINGS

FIG. 1b is an internal structural diagram of the solenoid valve of FIG. 1a.

DETAILED DESCRIPTION OF THE PREFERRED EMBODIMENT

Hereinafter, a device for stabilizing mast tilting angle and a method for controlling the same will be described in detail with reference to the accompanying drawings.

Figure 1A:
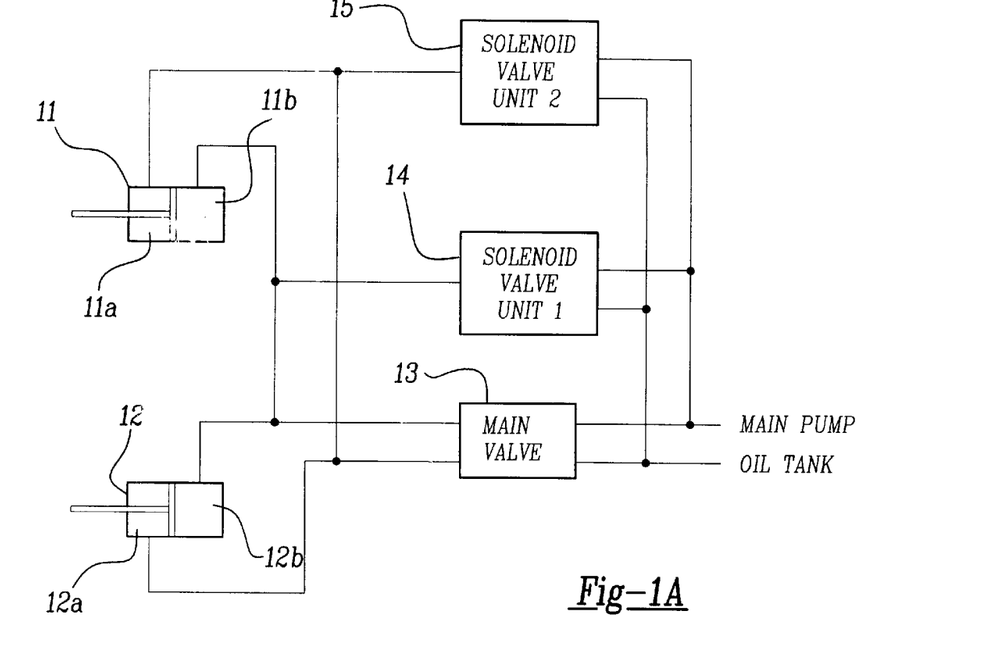
FIG. 1a is a hydraulic fluid circuit diagram of a device according to the present invention for stabilizing mast tilting angle of a cargo equipment.

FIG. 1a is a hydraulic fluid circuit diagram of a device for stabilizing the mast tilting angle in a cargo equipment according to the present invention, which comprises tilt-cylinders 11, 12, solenoid valve units 14, 15 and a main valve 13. The hydraulic fluid circuit connected to a main pump and an oil tank is connected to one end of the first solenoid valve unit 14 and to the one end of the second solenoid valve unit 15. The other end of the main valve 13 is connected to the small and large chambers 11a, 12a, 11b, 12b of the two tilt-cylinders 11, 12, the other end of the first solenoid valve unit 14 is connected to the large chambers 11b, 12b of each tilt-cylinders 11, 12. Similarly the other end of the second solenoid valve unit 15 is connected to the small chambers 11a, 12a of each tilt-cylinders.

Figure 1B:
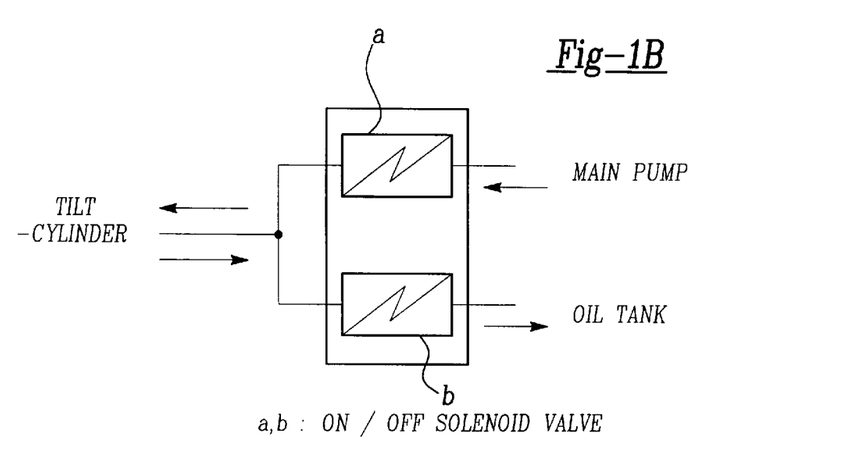

The mast angle is controlled by the direct decision of the driver as to the direction of the hydraulic fluid by lever control to drive the tilt-cylinders 11, 12. The solenoid valve units 14, 15 are connected in parallel to the main valve 13, and drive the tilt-cylinders 11, 12 by deciding the supply direction of the hydraulic fluid separately from the main valve 13. Consequently, this regulates the angle of the mast and switches the fluid passage electrically in response to the driving signal of the solenoid valve. FIG. 1a and FIG. 1b show the internal structure of each solenoid valve 14, 15. The valves a, b are turned on/off in response to the driving signal generated by the control unit 22 of FIG. 2. There is no case where the two valves are open simultaneously. The solenoid valve units 14, 15 act to supply a hydraulic fluid automatically during activation of the device for stabilizing the tilt of the cargo equipment. The solenoid valve units 14, 15 are not operable when the main valve unit is running. On the contrary, only the main valve 13 is activated with the solenoid valve units 14, 15 cut off when the hydraulic fluid is manually supplied by the driver. The tilt-cylinders 11, 12 are supplied with the hydraulic fluid through the fluid passage depending on the working conditions of the main valve 13 and the solenoid valve units 14, 15 in order to regulate the mast angle.

Figure 2:
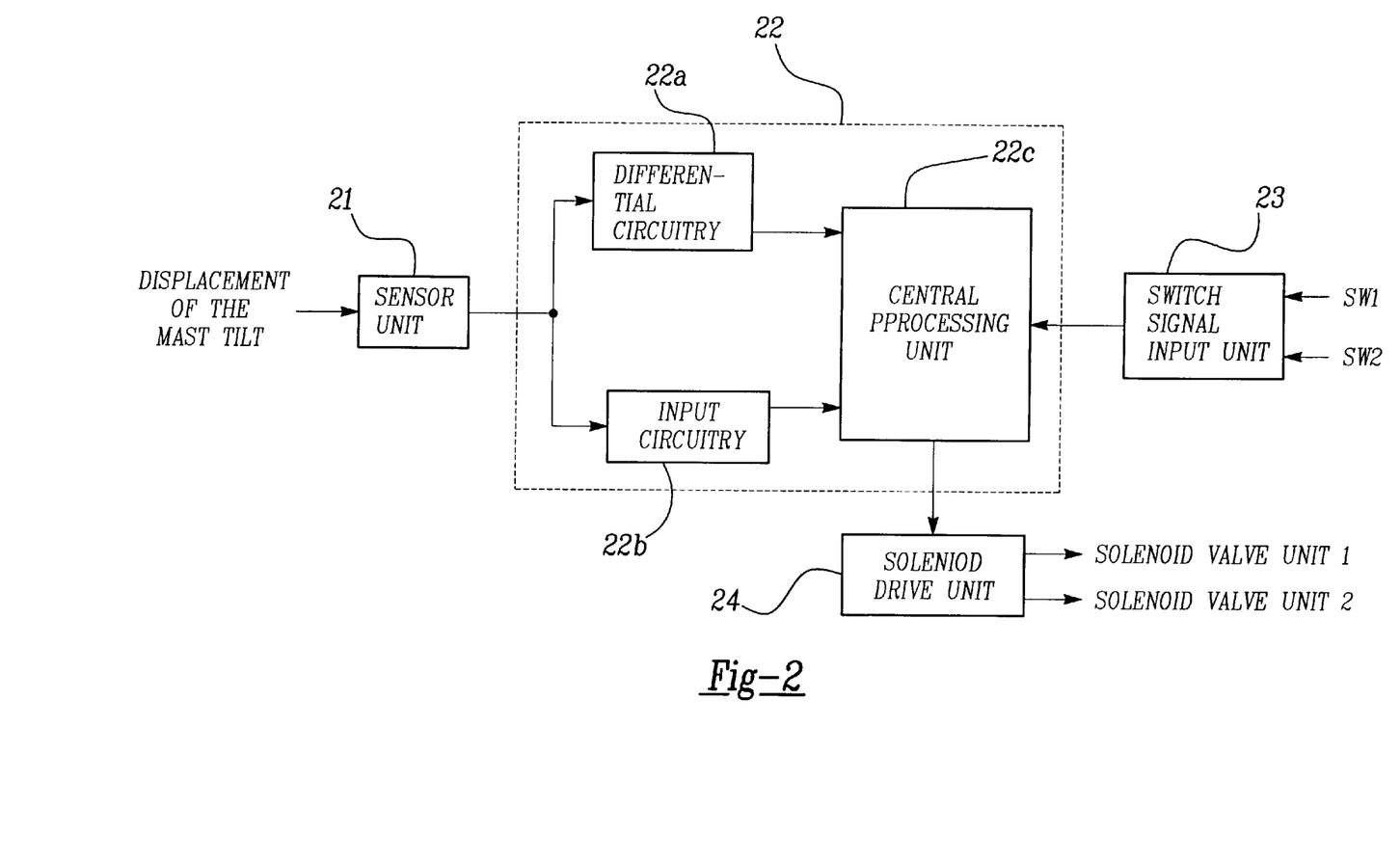
FIG. 2 is a block diagram showing an electric circuitry for a control unit according to the present invention.

FIG. 2 is a block diagram showing the electric circuitry of the equipment control unit according to the present invention, where a sensor unit 21, a control unit 22 connected to the output terminal of the sensor unit 21, a solenoid valve driving unit 24 connected to the output terminal of the control unit 22 and a switch signal input unit 23 connected to supply switch signal to the control unit 22 are provided. The control unit 22 comprises a differential circuitry 22a connected to the output terminal of the sensor unit 21, an input circuitry 22b and a central processing unit 22c connected to the differential circuitry 22a, the input circuitry 22b, a switch signal input unit 23 and a solenoid drive unit 24.

The activation of the control unit is hereinafter described. After transforming displacement of the mast tilt into an electric signal by means of sensor unit 21, the electric signal is applied to the differential circuitry 22a and input circuitry 22b. The output signals of the differential circuitry 22a and the input circuitry 22 within the control unit 22 are transferred to the central processing unit 22c. Another input signal to the central processing unit 22c is the switch signal SW1 and the switch signal SW2 transferred through the switch signal input unit 23. The switch signal SW1 is a signal to automatically compensate and thereby stabilize mast tilt in the cargo equipment which is embodied by the on/off switch of the two solenoid valve units 14, 15. The switch signal SW2 is a signal to control the mast tilt through the control of the lever. After receiving the input signals, the central processing unit 22c sends a signal to the solenoid valve driving unit 24 thereby driving the solenoid valve 14, 15 according to the condition of the signals. The driving conditions are as follows.

TABLE 1

| | The First Solenoid Valve Unit | | |
|---|---|---|---|
| Valve and Mode | 1 | 2 | 3 |
| The Second Solenoid Valve Unit | 1 | | 0 |
| | 2 | 0 | |
| | 3 | | 0 |

Mode 1 in table 1 is a hydraulic fluid supply mode supplying hydraulic fluid to the tilt-cylinder by means of the main pump, where only the valve a of the FIG. 1b is turned off. Mode 2 of Table 1 is a hydraulic fluid discharge mode for discharging the hydraulic fluid of the tilt-cylinder to the oil tank, where the valve b of the FIG. 1b is turned on. Mode 3 is a turned off mode cutting off the solenoid valve where both of the two valves of FIG. 1b are turned off.

Figure 3A:
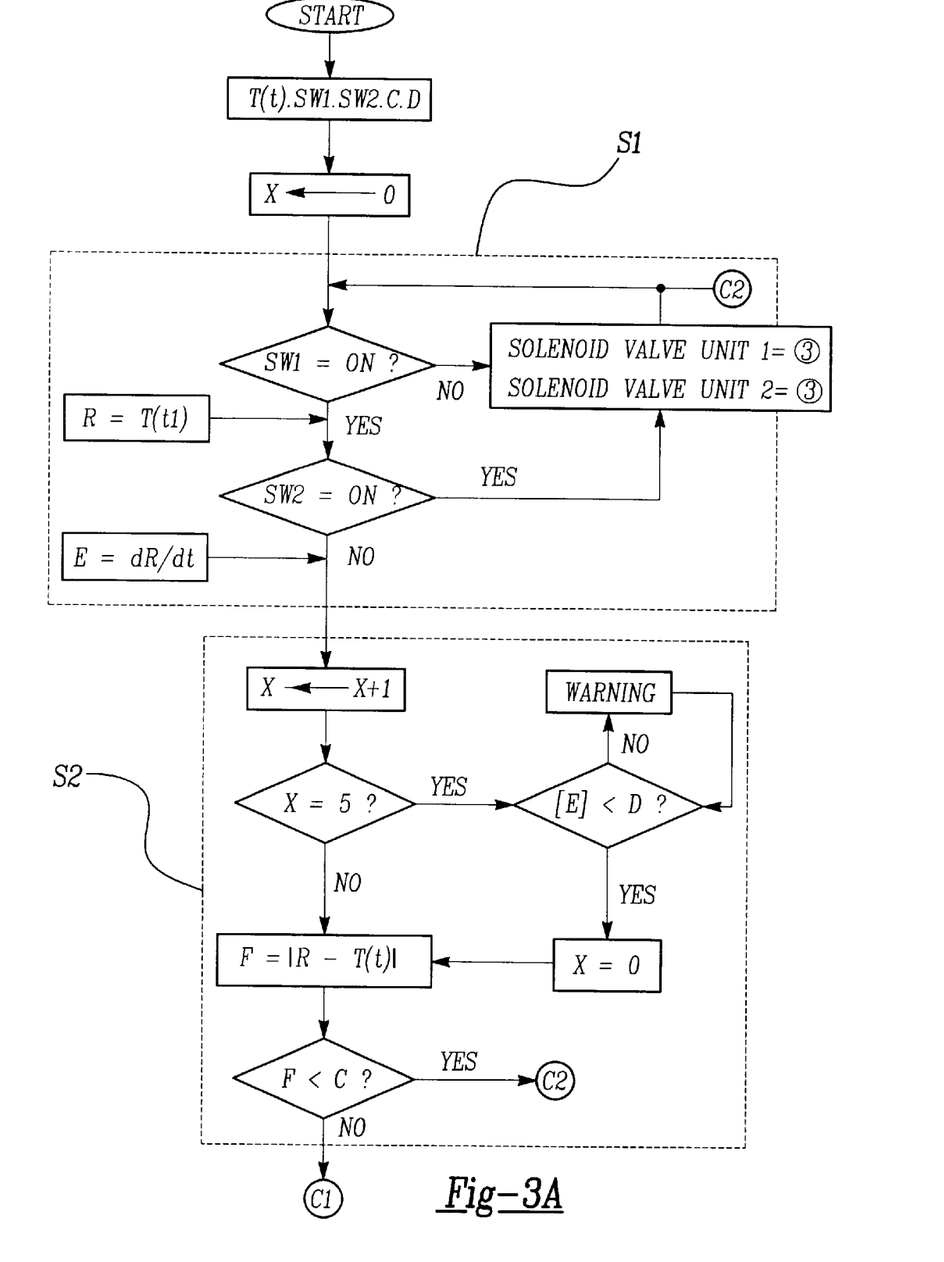
FIGS. 3a and 3b are flow charts for the control method for controlling the equipment according to the present invention.
Figure 3B:
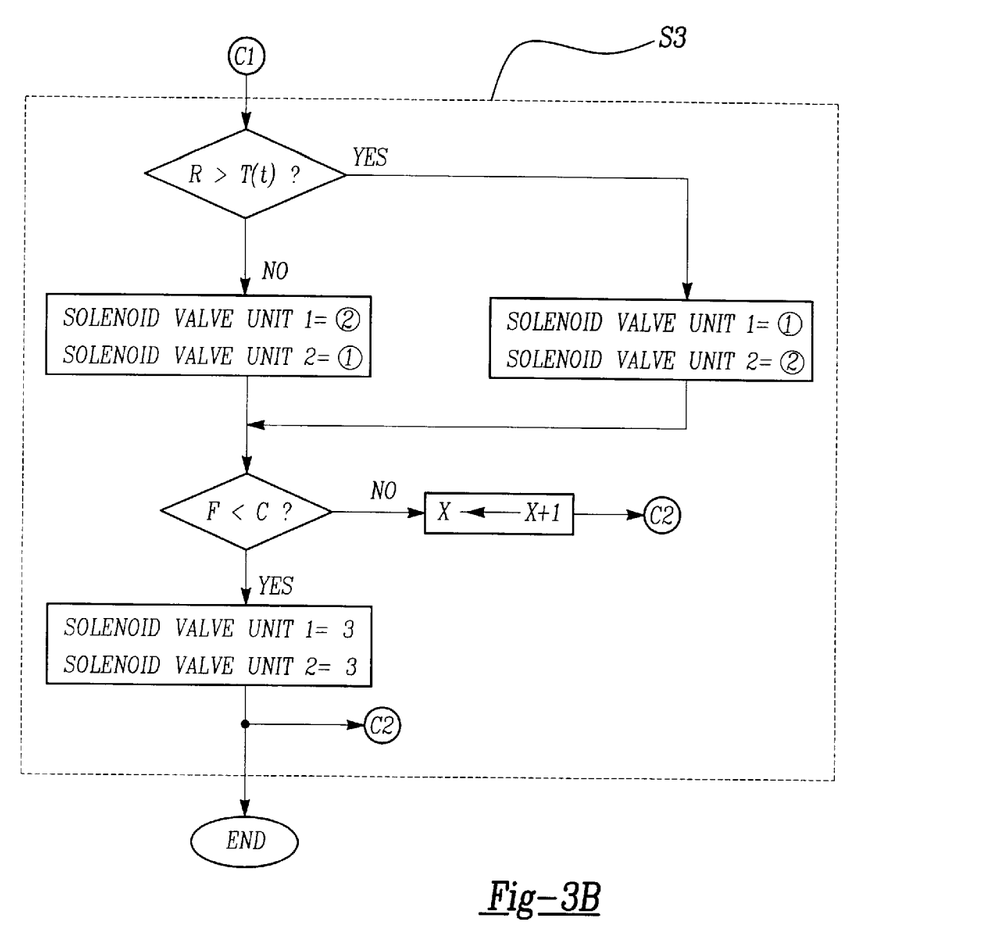

FIG. 3 is a flow chart showing the control method of the equipment according to the present invention, of which the process is as follows.

In order to drive the equipment properly, an initializing process for a tilt angle T(t) measured relative to the horizontal surface of the equipment front, SW1, SW2, allowance of the mast angle C, and allowance of the mast angle per hour D is necessary. The signal transferred to the control unit of the equipment decided by the driver according to the working conditions are C and D values. A variable X is established to control the equipment with predetermined steps of which the change is from zero to five with increment of one.

In the first step S1, if SW1 is off or SW2 is on, then all solenoid valves are cut off and no electric compensation to stabilize the tilt of the equipment is carried out (the first solenoid valve unit=off-mode 3, the second solenoid valve unit=off-mode 3). That is, the tilt-cylinder is driven only by the driver's operation of the control lever to activate the main valve. When SW1 is turned on, the mast tilt angle T(t1) at the time the SW1 is turned on is transferred to the control unit as the basic signal R.

The second step S2, where SW1 is turned on and SW2 is turned off, is an automatic control condition to stabilize the tilt of the equipment. The variable X is increased from one to five by increment of one, and when the value is five, the output absolute value |E| of the differential circuitry 22a of FIG. 2 is compared with the value of D. If the value |E| is larger, then it is regarded as a warning region, and a warning which continues for a predetermined period is indicated for the driver. This situation occurs when the surface tilt change is severe or when the driving speed is too fast for continuous stabilization. In this case, the driver has to decrease the speed of the equipment to a degree where the present absolute change of the mast tilt per hour |E| is lower than the change allowance of the mast tilt per hour D. If the warning sign is terminated or the value of |E| is smaller than that of D, the variable X takes a value of zero. Also, the difference between the basic signal R and the tilt angle T(t) is calculated same as in the case where the variable X was smaller than five, followed by comparison of the absolute value F with the allowance of the mast tilt. If the value F is smaller than that of C, then returns to the first step, whereas if not, third step S3, that is a compensation step by the solenoid valve unit is carried out.

Figure 4:
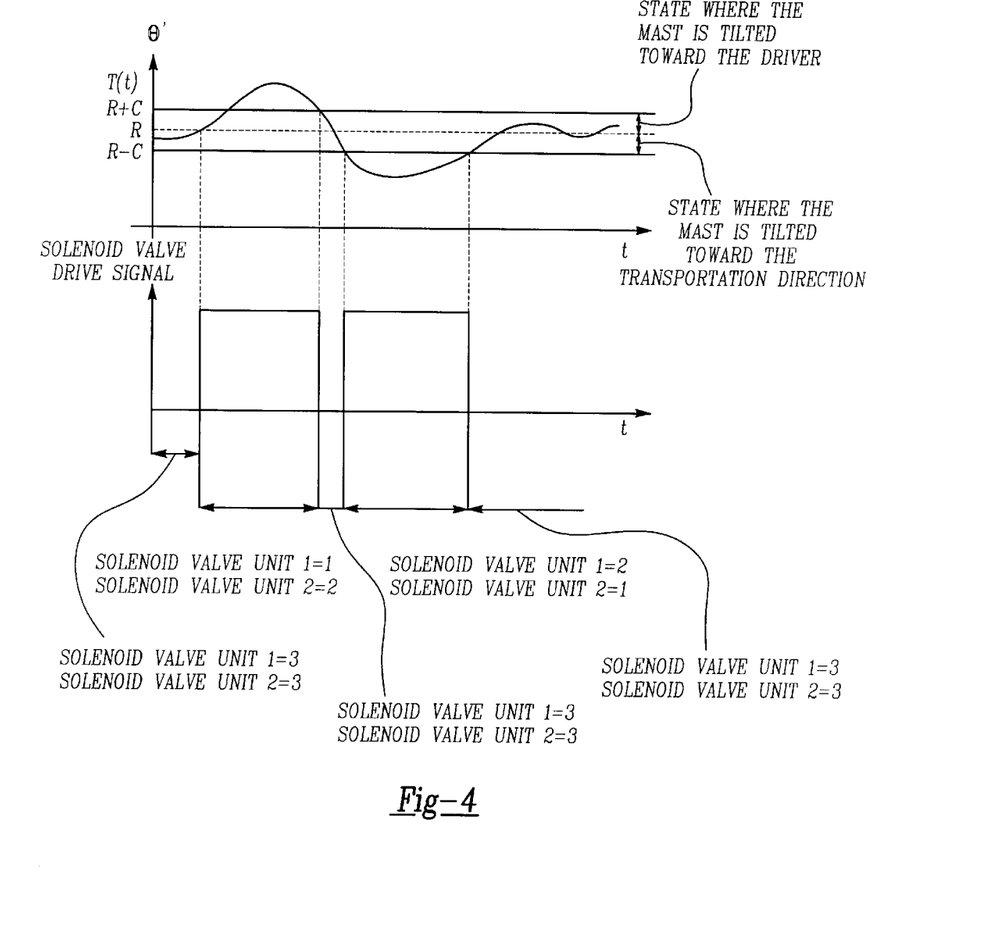
FIG. 4 is a graph showing the activation conditions of the solenoid valve according to the present invention.
Figure 5:
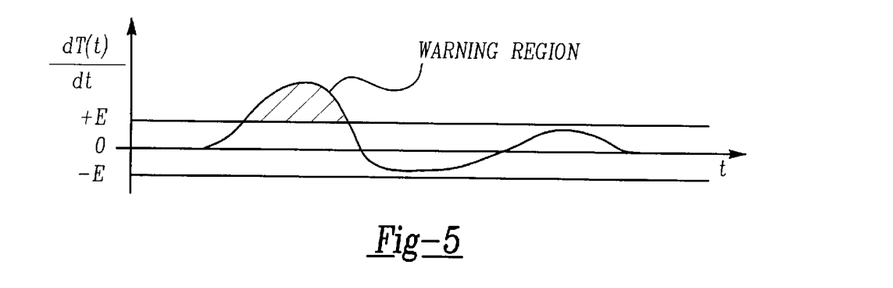
FIG. 5 is a graph showing the warning region during the activation of the present invention.

In the third step, if the basic signal R is larger or smaller than the tilt angle T(t), that is, if the mast is tilted towards the driver or tilted towards the opposite side of the driver, each solenoid valve is appropriately driven to compensate for the tilt angle (Refer to FIG. 4 and table 1). If the value of F after the compensation is larger than that of C, the first step is repeated after increasing the value of the variable by increment of one. If the value of F is smaller than the value of C, compensation ends and both of the solenoid valves are turned off. This terminates the activation of the device for stabilizing mast tilting angle.

Figure 6:
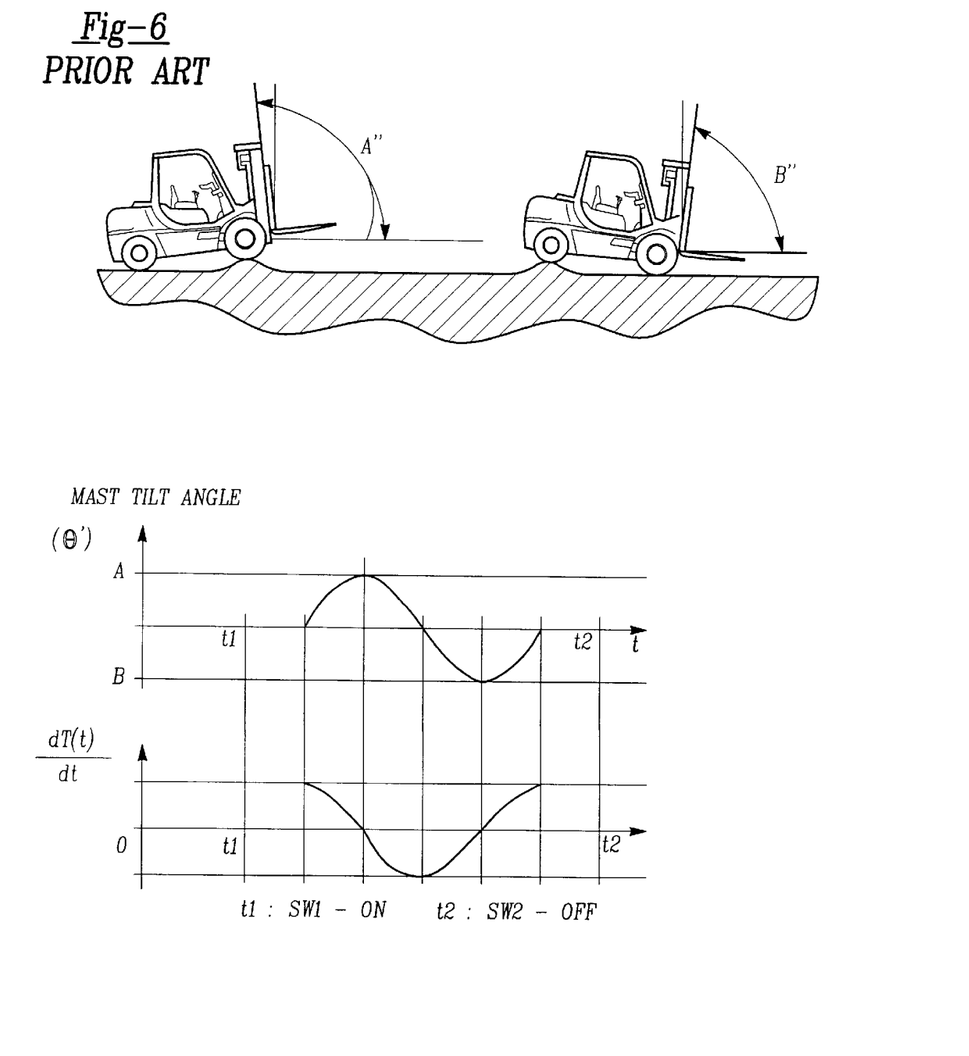
FIG. 6 is a diagram showing change in mast angle of the prior art equipment when passing through a sloped terrain.
Figure 7:
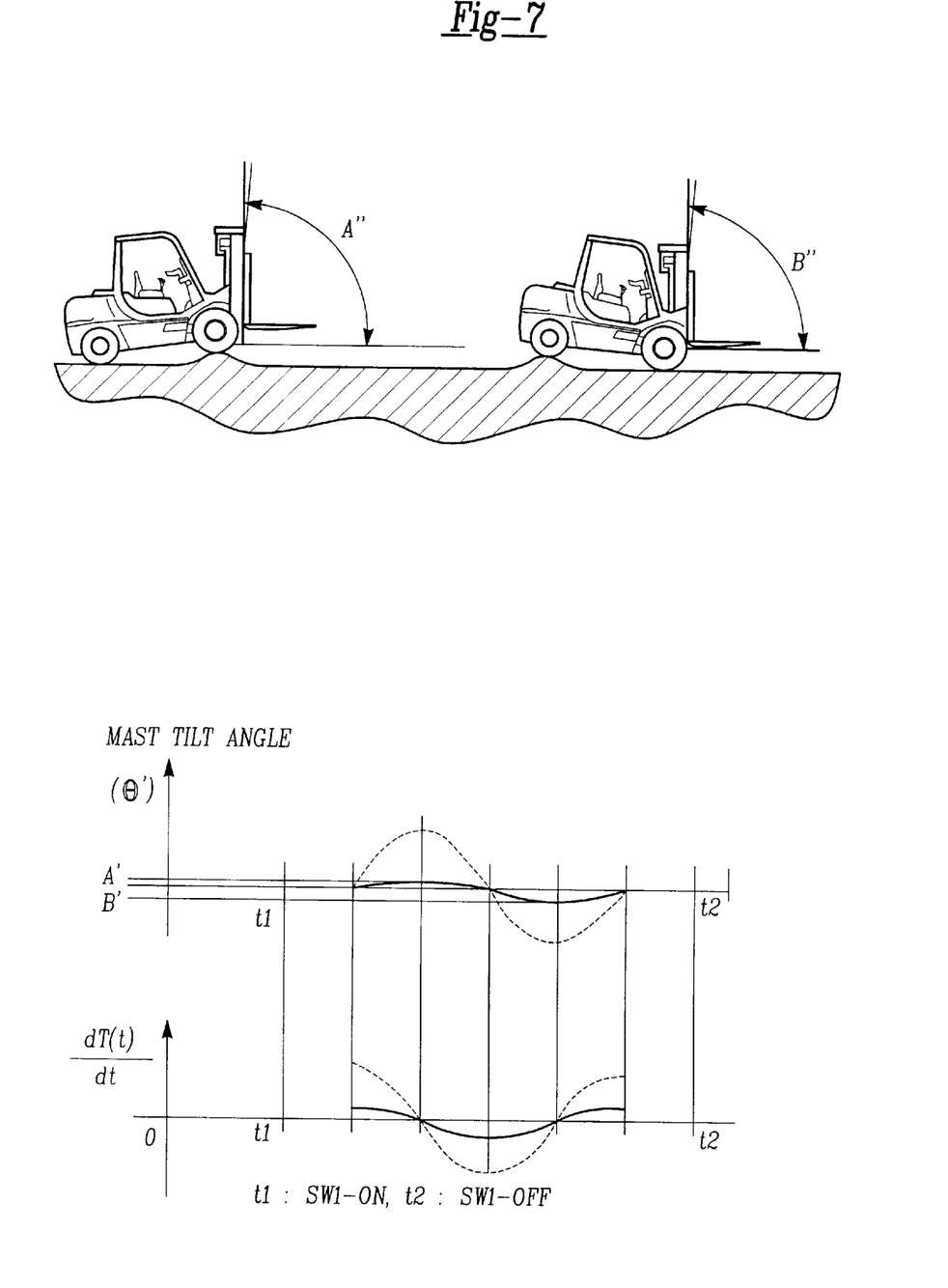
FIG. 7 shows the stability of the equipment with the device according to the present invention under the same condition of FIG. 6.

FIG. 6 describes the differential value of the mast angle change relative to time, when the prior art equipment is passing through a sloped terrain. FIG. 7 is a diagram showing the stability of the equipment with the present invention under the same condition of FIG. 6. Between t1 and t2, SW1 is turned on and the device for stabilizing the mast tilt and the control method for the same according to the present invention is activated.

As described above, according to the present invention, a device and a method for warning the driver when insufficient stability is attained from sensing the mast tilt and then compensating the displacement, is provided. This maintains tilting angle of the mast within certain range with considerations regarding conditions of the terrain and the speed of the equipment, thereby enhancing the work efficiency and safety of the operation.

What is claimed is:

1. A device for stabilizing a mast tilting angle of a cargo equipment, the cargo equipment being operated by a driver, said device comprising:

a hydraulic tilt-cylinder for controlling the mast tilt angle of the cargo equipment;

a main valve supplying hydraulic fluid to said tilt-cylinder, said main valve adapted to be actuated by the driver;

a plurality of solenoid valves being independent from said main valve, said plurality of solenoid valves selectively actuating said tilt-cylinder in response to electrical signals; and a control unit outputting said electrical signals to said plurality of solenoid valves in response to a speed of the cargo equipment and a surface terrain.

2. A device for stabilizing a mast tilting angle of a cargo equipment, the cargo equipment being operated by a driver, said device comprising:

a hydraulic tilt-cylinder controlling the mast tilt angle of the cargo equipment;

a main valve supplying hydraulic fluid to said tilt-cylinder, said main valve adapted to be actuated by the driver;

a plurality of solenoid valves being independent from said main valve, said plurality of solenoid valves selectively supplying hydraulic fluid to said tilt-cylinder in response to solenoid driving signals;

a solenoid driving unit for outputting said solenoid driving signals;

a sensor unit transforming displacement of the mast tilt angle into an electric sensor signal;

a switch signal input unit transferring a switching signal to automatically compensate and stabilize the mast tilt angle and transferring another switching signal to control tilt angle according to the operation of the driver; and a control unit receiving the signals from the sensor unit and the switch signal input unit, and controlling the solenoid driving unit according to the switch signal and the electric sensor signal.

3. The device according to claim 2, wherein said control unit further comprises:

a differential circuitry unit differentiating output signal of the sensor relative to time;

an input circuitry unit transferring output signal of said sensor unit; and a central processing unit connected to said differential circuitry unit and said input circuitry unit, receiving output signal from said input circuitry unit, and transferring control signal to the solenoid valve driving unit.

4. A control method for stabilizing a mast tilting angle of a cargo equipment, said method comprising the steps of:

determining whether to automatically compensate the mast tilt angle depending on the state of a switch signal automatically stabilizing the mast tilt angle and the state of a switch signal corresponding to the direct operation of the driver to control the mast tilting angle;

determining whether actual mast tilting angle exceeds a permissible allowance tilting angle and whether compensation to stabilize is needed; and driving solenoid valve according to the determining steps to compensate for the tilting angle.

5. The method according to claim 4, wherein the differential value of the mast tilting angle relative to time is compared with the change allowance relative to time, and indicating a warning signal when differential value of the mast tilting angle relative to the time is larger.

* * * * *